United States Patent [19]

Aloisio, Jr. et al.

[11] 4,409,263
[45] Oct. 11, 1983

[54] METHODS OF AND APPARATUS FOR COATING LIGHTGUIDE FIBER

[75] Inventors: Charles J. Aloisio, Jr.; Terrence A. Lenahan, both of Chamblee; James V. Smith, Jr., Decatur; Carl R. Taylor, Lawrenceville, all of Ga.

[73] Assignees: Western Electric Co., Inc., New York, N.Y.; Bell Telephone Laboratories, Inc., Murray Hill, N.J.

[21] Appl. No.: 343,134

[22] Filed: Jan. 27, 1982

[51] Int. Cl.³ .......................... G02B 5/14; G02B 1/10; B05C 3/12
[52] U.S. Cl. ..................................... 427/163; 118/405
[58] Field of Search .......................... 118/405; 427/163

[56] References Cited

U.S. PATENT DOCUMENTS

| | | | |
|---|---|---|---|
| 2,740,989 | 4/1956 | Henning . | |
| 2,787,980 | 4/1957 | McDermott | 118/405 |
| 3,598,085 | 8/1971 | Carreker | 118/405 |
| 3,947,173 | 3/1976 | Dougherty | 425/113 |
| 3,960,530 | 6/1976 | Iyengar | 427/163 X |
| 4,116,654 | 9/1978 | Trehu | 427/163 X |
| 4,246,299 | 1/1981 | Ohls | 427/163 X |
| 4,264,649 | 4/1981 | Claypoole et al. | 427/163 |
| 4,349,587 | 9/1982 | Aloisio et al. | 427/163 |

Primary Examiner—James R. Hoffman
Attorney, Agent, or Firm—F. W. Somers

[57] ABSTRACT

A coating material is applied to drawn lightguide fiber in a manner which substantially prevents the inclusion of bubbles and which causes the fiber to be disposed substantially concentrically within the coating layer. The lightguide fiber is advanced through a continuum of coating material, which extends from a free surface of a reservoir and through first and second dies that are arranged in tandem, at a velocity which causes air to be entrained in the coating material. A pressure gradient is established between portions of the first die adjacent to its exit orifice. The first die communicates with the reservoir and is spaced from the second die to provide a chamber which communicates with a pressurized supply of the coating material. The pressurized flow sufficiently enhances the pressure gradient in the first die and establishes sufficient volumetric flow of coating material upwardly through the first die to cause any bubbles in the coating material on the advancing fiber to be removed by recirculating streamlines and to be moved upwardly into the reservoir. Not only is the coating in the fiber substantially free of entrained air as it leaves the second die, but the fiber is disposed concentrically within the coating because of a precentering effect of the first die and enhanced self-centering caused by pressure in the chamber.

27 Claims, 7 Drawing Figures

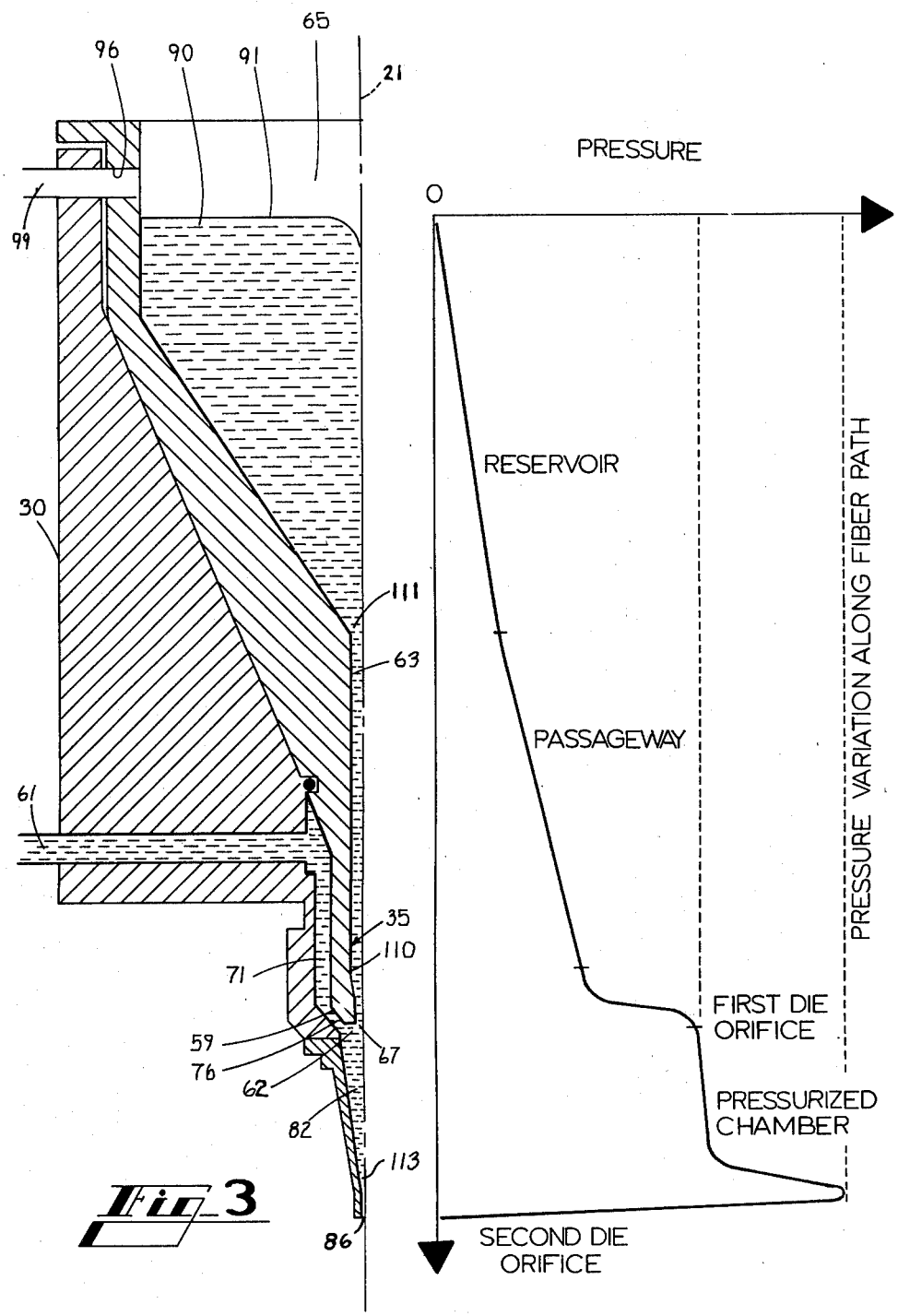

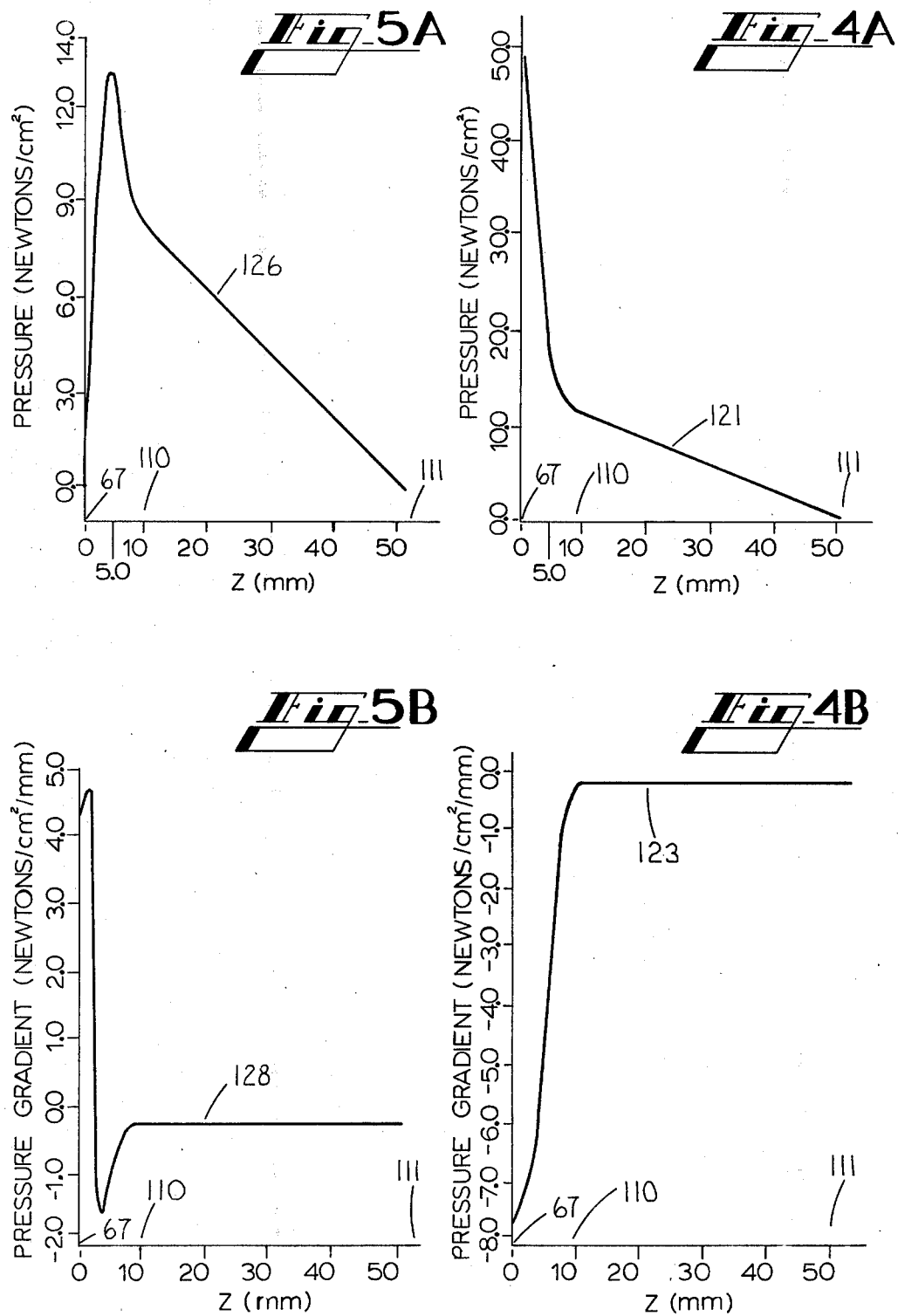

METHODS OF AND APPARATUS FOR COATING LIGHTGUIDE FIBER

TECHNICAL FIELD

This invention relates to methods of and apparatus for coating elongated material. More particularly, it relates to methods of and apparatus for applying a layer of a substantially bubble-free coating material concentrically about a lightguide fiber which is drawn from an optical preform.

BACKGROUND OF THE INVENTION

The successful implementation of a lightwave communication system requires the manufacture of high quality lightguide fibers having mechanical properties sufficient to withstand stresses to which they are subjected. Typically, the fiber has an outside diameter of 0.13 mm and is drawn from a glass preform having an outer diameter of 17 mm. Each fiber must be capable of withstanding over its entire length a maximum stress level which the fiber will encounter during installation and service. The importance of fiber strength becomes apparent when one considers that a single fiber failure will result in the loss of several hundred circuits.

The failure of lightguide fibers in tension is commonly associated with surface flaws which cause stress concentrations and lower the tensile strength from that of the pristine unflawed glass. The size of the flaw determines the level of stress concentration and, hence, the failure stress. Even micron-sized surface flaws cause stress concentrations which significantly reduce the tensile strength of the fibers.

Long lengths of lightguide fibers have considerable potential strength but the strength is realized only if the fiber is protected with a layer of a coating material such as a polymer, for example, soon after it has been drawn from a preform. This coating serves to prevent airborne particles from impinging upon and adhering to the surface of the drawn fiber which would serve to weaken it. Also, the coating shields the fiber from surface abrasion, which could be inflicted by subsequent manufacturing processes and handling during installation, provides protection from corrosive environments and spaces the fibers in cable structures.

In one process, the coating material is applied by advancing the lightguide fiber through a reservoir in an open cup applicator containing a liquid polymer material. Typically, the fiber enters the reservoir through a free surface, and exits through a relatively small die orifice at the bottom of the reservoir. The coating material is treated, the diameter of the coated fiber is measured and the fiber is taken up by a suitable capstan.

Uniform wetting of the fiber during the coating process is largely affected by the behavior of an entrance meniscus which exists where the fiber is advanced through the free surface of the coating material in the reservoir. As is well known, the wetting characteristics of two materials such as a coating and glass, depend on surface tension and chemical bonds which are developed between the two materials.

The wetting characteristics are affected by a pumping of air into the meniscus. During the coating process, both the fiber surface and the polymer surface are moving at a relatively high speed. The moving surfaces shear the surrounding air, causing it to flow into the point of the meniscus. The drawn fiber pulls a considerable amount of air into the coating material as it enters the free surface of the reservoir. Thus in the coating applicator, the entrance meniscus is drawn down with the moving fiber, instead of rising along its surface as it does under static conditions.

It has been found that as the draw rate exceeds about 0.2 meter per second, which is less than the commonly used rate of approximately one meter per second, this pumping action causes the meniscus to extend downwardly and develop essentially into a long, thin column of air which surrounds the fiber and is confined by surface tension in the coating material. Tests have shown that the viscosity of air is sufficiently high to sustain a column of air of considerable depth.

Air entrainment in the form of bubbles on the moving fiber occurs as relatively thin packets of air break off from the column and are carried along with the fiber on its surface. They remain on the fiber, resembling a skin, until they reach a region of pressure gradient in the vicinity of the die opening where they are compressed. This causes the air packets to bulge and form bubbles which may be removed by the surrounding flow lines leading away from the fiber. Should an air packet be compressed farther downstream where all the flow lines extend out of the die with the fiber, the bubble can exit along with the fiber. As the quantity of these bubbles increases, more tend to pass through the die and remain in the coating on the fiber.

As the draw speed is increased, the meniscus becomes unstable, oscillating between a fully developed state with circulation and a relatively small one with little or no circulation. At higher speeds, the column can extend completely through the polymer coating material. In such case, the fiber no longer contacts the polymer, the meniscus collapses and the fiber exits the die with no coating material or with an intermittent, beaded coating.

Bubbles in the fiber coating or beaded coatings may cause several problems. Larger bubbles may extend through the coating thereby exposing the fiber to the environment and to mechanical effects such as abrasion whereas smaller size bubbles cause losses in transmission. In the case of a beaded structure, portions of the fiber may be inadequately coated, while the beads themselves can increase microbending losses when the fiber is packaged into a ribbon assembly. If the fiber is not centered within the coating, portions of its periphery may be inadequately protected from the environment. Instabilities associated with air entrainment can produce fiber misalignment within the coating as well as coating diameter variations. Also, as in the case of smaller bubbles, poor centering can cause transmission losses.

As the coating progresses, bubbles accumulate in the reservoir. It has been found that these bubbles move rapidly with the streamlines in the fluid and coalesce into larger ones. The large, coalesced bubbles interact mechanically with the fiber causing instabilities in fiber alignment with the die.

The prior art has addressed these problems. For example, in one method, the fiber is advanced through an opening in a baffle plate positioned in a reservoir to alleviate or substantially eliminate entrainment of air and consequent bubble formation in the fiber coating. Bubbles are stripped from a region about the fiber due to a hydrodynamic pressure increase in the fluid pressure as the fiber passes through the constriction in the fluid path caused by the baffle plate. Pressure changes are made by changing the geometry of the arrangement such as, for example, the size of the baffle plate opening.

Another coating applicator is shown in U.S. Pat. No. 4,246,299. A fiber is passed through an applicator having a die body that defines a small vertically oriented, longitudinal tapered passage having a reservoir disposed thereabout. A series of radial ports provide fluid communication between the reservoir and the passage. Turbulence within the coating material, which causes entrapment of air bubbles, is reduced by maintaining the level of the coating material in the passage.

In still another apparatus, coating material is directed under pressure radially inward toward a cylindrical passage through which the fiber is advanced. The pressure is maintained sufficiently high along the length of the passage to prevent substantially air from entering the passage as the fiber is pulled therethrough. The diameter of the passage is sufficiently large to prevent contact of the fiber with its sides.

As for the familiar extrusion coating of plastic on copper to produce an insulated conductor, the conductor is drawn through a close-fitting core tube, through a die cavity and through the die land wherein a polymer coating is applied at high pressures. However, when coating lightguide fibers, care must be taken to avoid contact of the drawn fiber with the coating apparatus.

Notwithstanding the existence of proffered solutions to the problem of bubbles in lightguide fiber coatings, there still appears to be a need for methods and apparatus which reliably substantially reduce, if not eliminate such bubbles. Each layer of coating material should be one which is continuous, well-centered about the lightguide fiber and uniformly thick.

SUMMARY OF THE INVENTION

The foregoing problems have been overcome by the methods and apparatus of this invention. A method of coating an elongated material to provide a substantially bubble-free covering includes the provision of a continuum of liquid coating material, which extends from a free surface in a reservoir through first and second dies at opposite ends of a chamber. The elongated material, which may be drawn lightguide fiber, is advanced through the coating material at a velocity which causes air to become entrained in the coating material and in a direction from the reservoir to the second die. The advance of the elongated material through the coating material causes a pressure gradient to be established between portions of the first die and between the chamber and the second die. The pressure in the coating material decreases from an exit orifice of the first die to the free surface and increases from within the chamber to a location prior to an exit orifice of the second die. Coating material is flowed into the chamber at a pressure which sufficiently enhances the pressure gradient between the portions of the first die to cause air packets on the elongated material to be transformed into bubbles. The introduction of the coating material into the chamber also establishes a volumetric flow of the coating material from the chamber into the reservoir. This is effective to cause the bubbles to be released and causes the coating material in the chamber and on the coated elongated material to be substantially bubble-free.

In an apparatus for applying a substantially concentrically disposed bubble-free coating material to an elongated material, a container is provided to hold a reservoir of the coating material. The coating material has a free surface and extends through an elongated passageway of a cavity of a first die through an exit orifice and through a cavity of a second die and its exit orifice. The lightguide fiber is advanced through the container, the first die, and the second die at a velocity which is sufficiently high to cause air to become entrained in the coating material. A pressure gradient is established between portions of the first die and between the cavity of the second die and a location adjacent to its exit orifice. The pressure decreases in a direction from the exit orifice of the first die to the free surface and also increases from a location within the cavity of the second die to a point adjacent to the exit orifice of the second die. The apparatus also includes means for directing a flow of the coating material into the second die at a pressure which is sufficiently high to cause a volumetric flow of the coating material upwardly from the cavity of the second die into the container. It is also sufficiently high to enhance substantially the pressure gradient between portions of the first die, particularly between the elongated passageway and the exit orifice. As a result, bubbles are removed from the fiber and migrate into the reservoir where they coalesce and break apart or flow out through an overflow. The coating material in the second die is substantially bubble-free thereby resulting in a substantially bubble-free coating on the fiber.

BRIEF DESCRIPTION OF THE DRAWINGS

Other features of the present invention will be more readily understood from the following detailed description of specific embodiments thereof when read in conjunction with accompanying drawings, in which:

FIG. 3 is an elevational view in section of a left hand portion of the coating apparatus shown in FIG. 2 together with a graph of the pressure in the coating material along a path of travel of the lightguide fiber through the coating apparatus;

FIGS. 4A and 4B are two graphs which relate to the pressure in the coating material and the pressure gradient with respect to a portion of the coating apparatus shown in FIG. 2; and FIGS. 5A and 5B are two graphs of pressure gradient which relate to a prior art coating apparatus.

DETAILED DESCRIPTION

Figures 1, 2:
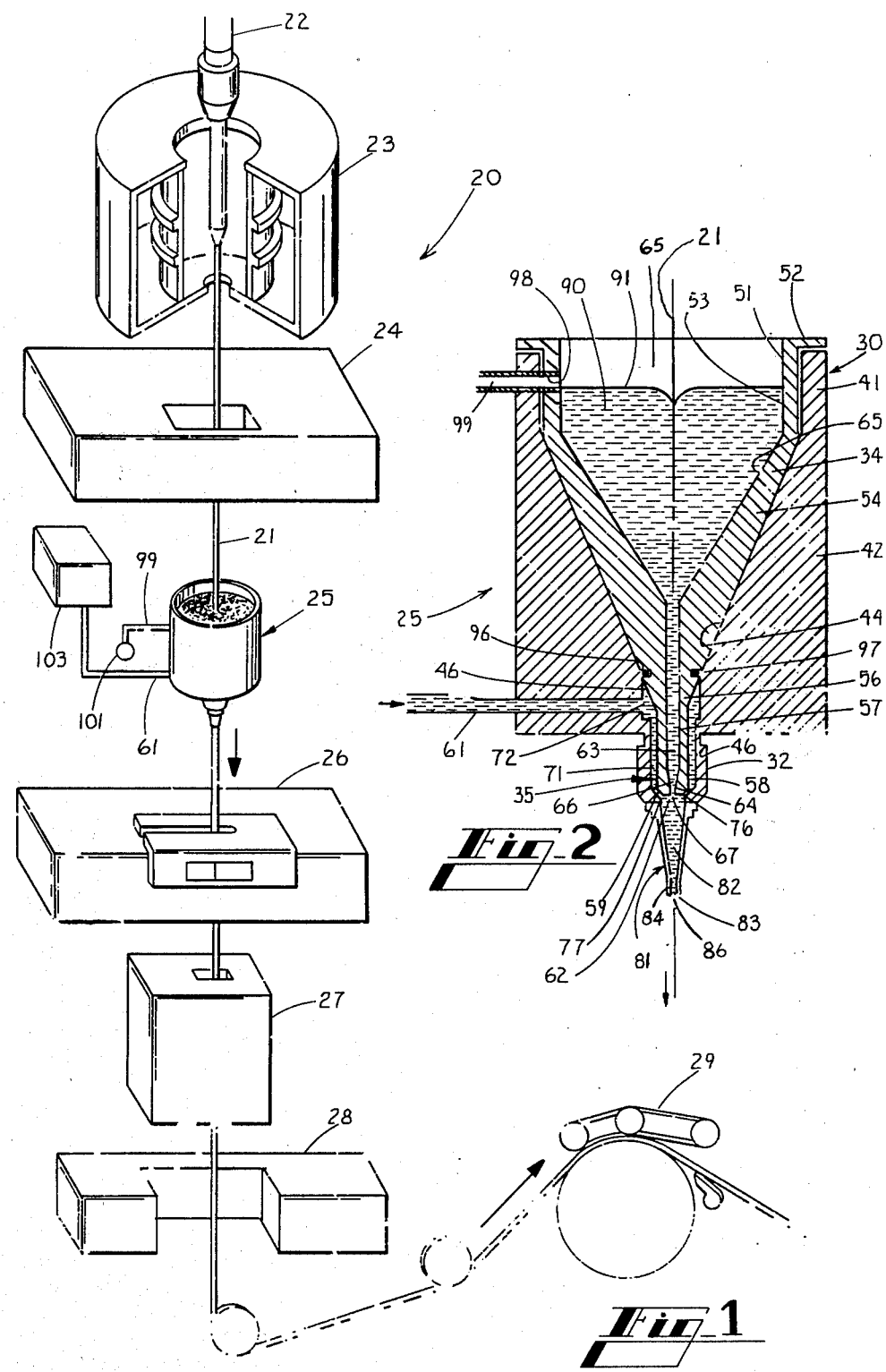
FIG. 1 is a perspective view of an apparatus for drawing lightguide fiber from a vertically suspended preform and for coating the drawn fiber.
FIG. 2 is a side elevational view of an apparatus for coating the drawn lightguide fiber.

Referring now to FIG. 1, there is shown an apparatus which is designated generally by the numeral 20 and which is used to draw a lightguide fiber 21 from a specially prepared cylindrical preform 22 and to then coat the fiber. The lightguide fiber 21 is formed by locally and symmetrically heating the preform 22 which is typically 17 mm in diameter and 60 cm in length to a temperature of about 2000° C. As the preform is fed into and through a furnace 23, fiber 21 is drawn from the molten material.

As can be seen in FIG. 1, the elements of the draw system include the furnace 23, wherein the preform is drawn down to the fiber size, after which the fiber 21 is pulled from the heat zone. The diameter of the fiber 21 which is measured by a device 24 at a point shortly after the furnace 23 becomes an input into a control system. Within the control system, the measured diameter is compared to the desired value and an output signal is generated to adjust the draw speed such that the fiber diameter approaches the desired value.

After the diameter of the fiber 21 is measured, a protective coating is applied by an apparatus 25 of this invention. Then, after the coated fiber 21 passes through a centering gauge 26, a device 27 for treating the coating and a device 28 for measuring the outer diameter of the coated fiber, it is moved through a capstan 29 and is spooled for testing and storage prior to subsequent operations. The preservation of the intrinsically high strength of lightguide fibers is important during the ribboning, jacketing, connectorization and cabling of the fibers and during their service lives.

Preservation of fiber strength requires the application of the protective coating, which shields newly drawn fiber from the deleterious effects of the atmosphere. This coating must be applied in a manner that avoids damage to the surface of the fiber 21. An off-centered fiber 21 may result in damage to its fiber surface during the coating process which can have an adverse effect on fiber strength and microbending loss. The fiber must have a predetermined diameter and be protected from abrasion during subsequent manufacturing operations, installation and service. Minimizing attenuation requires the selection of a suitable coating material and a controlled application of it to the fiber 21. It is also important that the coating layer be disposed concentrically about the lightguide fiber.

As can be seen in FIG. 2 of the drawings, the apparatus 25 for coating the drawn lightguide fiber 21 includes a cylindrical housing 30 having a depending portion 32 and an insert 34. A lower end of the insert 34 includes a die 35, which is designated as the first die, and which is made of a rigid material such as brass, for example. The housing 30 is designed to hold the insert 34 to provide a reservoir of the coating material which is constantly recircuated and replenished, as well as an overflow therefrom.

Again referring to FIG. 2, it is seen that the housing 30 includes a constant thickness, cylindrical wall section 41 which is joined to a diverging wall portion 42. The diverging portion 42 provides a cavity 44 having a truncated conical shape which communicates with a lower portion 46 having a generally constant diameter.

The insert 34 includes an upper portion 51 having a flange 52 which is supported on the wall section 41. A constant diameter section 53 is received within the constant diameter section 41 of the housing and is joined to a conically shaped portion 54 having a wall thickness which increases in a downward direction. A lower end 56 of the conically shaped portion 54 is connected to a constant diameter portion 57 which extends into a cylindrical cavity 58 of the depending portion 32. An end of the constant diameter portion 57 is formed with a chamfer 59.

The insert 34 is constructed to provide fluid communication of the coating material from a supply conduit 61 through a chamber 62 below the insert 34 to a reservoir 65 of the insert. Accordingly, the insert 34 is formed with a vertically extending passageway 63 which extends from the chamber 62 through the constant diameter portion 57. The elongated passageway 63, which has a diameter of about 0.30 cm and a length of about 4 cm, may be regarded as a portion of a cavity of the first die 35. A land 64 of the die 35, which has a length of about 0.6 cm, is joined to the elongated passageway 63 through a tapered section 66. The land 64 includes an exit orifice 67 having a diameter of about 0.076 cm. As is best seen in FIG. 2, the exit orifice 67 opens to the chamber 62 within the depending portion 32 of the housing.

The cavity 58 and the diameter of the chamber 62 interior of the depending portion 32 are such as to provide a flow passage 71 of constant cross-section from the vicinity of an opening 72 of the supply conduit 61 to the vicinity of the exit orifice 67 of the die 35. A lower portion 76 of the cavity 58 is tapered and is joined to a constant diameter section 77 of the chamber 62.

A conically shaped second die 81 extends downwardly from and is connected to the depending portion 32. The second die 81 is made of a semi-rigid material such as fluorosilicone rubber, for examples, and includes a cavity 82 having a truncated conical shape. The cavity 82 communicates through a cylindrical opening 83 of a land 84 of the second die with an exit orifice 86. Typically, the conically shaped portion of the passageway has an included angle between its sides of about 30°. The land 84 of the cylindrical portion 83 has a diameter of about 0.025 cm which is the diameter of the coated fiber and a length of about 0.10 cm. The chamber 62 may be regarded as a portion of the die cavity 82.

For purposes of this invention, a continuum of coating material 90 is provided through which the lightguide fiber 21 is advanced. Beginning with a free surface 91 of the reservoir 65 in the insert 34, the coating material 90 extends through the passageway 63, tapered portion 66 and land 64 of the first die 35, through the exit orifice 67 and into the chamber 62 and through the second die 81.

Provisions are made for sealing the flow of the coating material from the supply conduit 61 upwardly. The cone-shaped portion of the insert 34 includes a groove 96 formed thereabout. An O-ring gasket 97 is positioned in the groove 96 and engages the surface of the housing 30 which engages the insert 34.

Also, provisions are made for overflow of the coating material 90 in the reservoir 65 to maintain a substantially constant level of the coating material. Accordingly, an opening 98 is formed through the constant diameter section 53 of the insert and through the upper portion of the wall 51. A conduit 99 connects the reservoir through a valve 101 to a collection tank (not shown). The conduit 61 is connected to a supply tank 103 (see FIG. 1).

The fiber 21 is advanced at a velocity which causes air to become entrained in the reservoir 65. The pressure at each point along the path of the fiber 21 is shown by the curve in FIG. 3. The advance of the fiber 21 also causes a pressure gradient to be established along its path of travel between the free surface of the reservoir and the exit die 35 with the gradient being a maximum at the exit orifice 67 of the die 35.

As can be seen from FIG. 3, the pressure within the coating material 90 decreases abruptly from the exit orifice 67 of the first die 35 to an exit 110 of the cylindrical passageway 63, then gradually to an entrance 111 thereof and then at another slope to the free surface 91. Unlike single die arrangements or those including an elongated land, the pressure also increases from the chamber 62 following the exit orifice 67 of the first die 35 to a point 113 in the vicinity of the second die 81. Afterwards, the pressure drops to zero at the exit orifice 86 of the second die 81.

Coating material from the supply tank 103 (see FIG. 1) is directed into the chamber 62 by flowing it along the conduit 61, then into the low passage 71 and through the angled passage 76. Sufficient positive pressure is applied to the coating material which is supplied to the chamber 62 to cause a volumetric flow of the coating material upwardly through the first die 35 into the reservoir 65. A suitable pressure is in the range of about 40 newtons per square centimeter. As the fiber is advanced through the continuum of coating material 90, some of the liquid is pulled downwardly through the first die 35 and into the chamber 62. The back pressure applied to that in the chamber 62 by means of the incoming liquid causes a flow upwardly through the first die 35. In a preferred embodiment, the overall result is a net flow upwardly.

FIGS. 4A and 4B show curves 121 and 123 to represent the pressure and the pressure gradient, respectively, from the entrance 111 of the passageway 63 to the first die 35 for a back pressure of about 48 newtons/cm$^2$ and for a first die exit orifice 67 having a diameter of 0.076 cm. It should be observed that the pressure and the pressure gradient are plotted against a z axis which represents distance that increases in a vertical direction from a value of zero at the orifice 67 of the first die 35. Points which correspond to points along the apparatus 25 are shown along the z axis in each graph. The pressure gradient is the change in pressure, i.e., the slope of the curve, at each point along the z axis. The negative sign for the values of pressure gradient is necessary by convention in order to show a decreasing pressure gradient in the direction of increasing z values. Since the pressure at the greater z value is less than that for a lesser z value along the curve 121, the difference divided by the distance between them along the z axis is a negative value.

FIGS. 5A and 5B show similar curves 126 and 128 of the pressure and pressure gradient, respectively, for a single die. The single die for which the curves 126 and 128 were plotted was identical to the insert 34 with the die 35 opening to ambient conditions.

For the graph in FIG. 4A, it is seen that the pressure has a maximum value at the exit orifice 67 of the first die 35. The pressure drops sharply for a distance up to the exit end 110 of the cylindrical passageway 63 whereafter it decreases gradually to the entrance 111. Although not shown on the graph of FIG. 4A, the pressure then decreases even more gradually from the entrance 111 to the free surface 91.

Returning now to the graph in FIG. 5A, it is seen that for the single coating die with no back pressure, the pressure increases in the die from a z value of about 52 mm, which corresponds to the entrance 111 of the passageway 63. It increases particularly through a converging section to a maximum pressure of about 13 newtons/cm$^2$ and then drops to zero at the die opening. The pressure increases sharply adjacent to the die exit orifice because of the convergence, but then drops to zero at the exit orifice.

Not only does a comparison of the graphs in FIGS. 4A and 5A show the effect of the introduction of pressurized coating material, but it also shows that its effects occur over a longer distance. For example, in the dual die arrangement of this invention, the steepest part of the pressure curve 121, which corresponds to the portion of highest gradients, occurs between z values of 0 and about 10 mm. In contrast, the steepest portion of the curve 126, which corresponds to its portion along which the gradients are highest, occurs between z values of 5 and about 10 mm.

Referring now to the graph in FIG. 4B for the die 35, the pressure gradient is seen to be about $-7.5$ newtons/cm$^2$/mm adjacent to the exit orifice 67 whereafter it decreases to the exit 110 of the passageway 63. Thereafter it is substantially constant to the entrance 111 of the passageway 63.

On the other hand, for the graph of FIG. 5B, it is seen that the pressure gradient is about $+4.3$ newtons/cm$^2$ adjacent to the exit orifice and reaches a value of only $-1.5$, which is its maximum value relative to bubble stripping, about 5 mm from the orifice. It then decreases to about 0.2 at the exit 110 of the passageway 63 and is substantially constant thereafter. As should be evident, the introduction of pressurized coating material into the chamber 62 enhances substantially the pressure gradient in the first die 35 between the orifice 67 and the exit 110 of the passageway 63.

It is important to recognize that because of the sign convention adopted for these graphs, a negative pressure gradient is helpful to the stripping of bubbles from the fiber 21 whereas a positive one is detrimental in that it is effective to push bubbles out of the single die along with the fiber. Consequently, in FIG. 5B, the maximum positive pressure gradient of $+4.6$ newtons/cm$^2$/mm, although more than half the maximum pressure gradient in FIG. 4B in absolute value, is detrimental to the object of bubble removal from the fiber surface.

As a result of the dual die arrangement of this invention, there are two pressure gradient barriers which become functionally important. One is that which occurs between portions within the first die 35 while the other occurs between the chamber 62 and a point just prior to the orifice 86 of the second die 81. The flowing of the pressurized coating material into the chamber 62 enhances the first pressure gradient between portions of the first die 35. The portion of the graph of FIG. 3 just prior to the first die 35 represents the enhanced pressure along portions of the first die due to the introduction of the pressurized coating material into the chamber 62.

Each of these barriers contributes to the removal of bubbles from the vicinity of the advancing fiber. The enhanced pressure gradient between the portions of the first die between the exit 110 of the passageway 63 and the exit orifice 67 of the first die 35 causes air packets which have been carried along with the fiber 21 to bulge into a bubble shape and attach to diverging recirculating streamlines. As a result of the back pressure in the coating material which is introduced into the chamber 62, the recirculating streamlines move closer to the advancing fiber. Consequently, bubbles do not have to cross as many streamlines before reaching one which is recirculating and which causes the bubbles to be removed from the fiber 21. The enhanced pressure gradient between portions of the first die 35 cooperates with the volumetric flow of coating material upwardly to remove the air packets and any resulting bubbles from the advancing fiber.

Bubbles which are removed by the first die 35 and released into the streamlines are carried upwardly into the reservoir 65. The bubbles which are returned upwardly into the reservoir 65 coalesce, break apart or flow out of the reservoir through the conduit 99. As a result, any coating material in the chamber 62 is substantially bubble-free. As added assurance for a bubble-free coating, the second barrier between a point within the chamber 62 and a point prior to the exit orifice 86 of the second die 81 is effective to strip any bubbles that may be in the chamber 62 between the dies 35 and 81.

The introduction of a pressurized coating material into the chamber 62 between the two dies 35 and 81 also changes the abruptness of the pressure gradient between portions of the first die. It will be recalled that whereas the pressure gradient in the commonly used open cup applicators is greatest over a length of about 5 mm, those in this inventive arrangement appear over a range of 10 mm. This is advantageous since the effectiveness of bubble stripping is directly proportional to the distance over which the pressure gradient is applied. Moreover, the absolute magnitude of the pressure gradient in the present arrangement is larger than that of the conventionally used open cup applicator.

It is important to recognize that it is the gradient and not just the absolute magnitude of the pressure which causes the stripping. In fact, the existence of merely a high pressure may be disadvantageous since it will cause compression of any bubbles in the coating material which will expand in the final coating in the absence of pressure and which may erupt into craters on the fiber surface.

The application of a controlled back pressure allows the control of the net volumetric flow through the 0.076 cm first die 35 and results in substantially different pressure gradients throughout the critical region in the vicinity of the die orifice 67. In commonly used coating arrangements, there exists only a static pressure head which does not, without changing the geometry, allow this kind of control.

For a given line speed and the application of a specific back pressure, a specific net volumetric flow of coating material is obtained through the 0.076 cm first die 35. Also, there will be a characteristic pressure gradient at the specific pressure. In order to provide a suitable coating arrangement for several product lines, a range of back pressures can be applied for a given line speed in order to obtain a family of net volumetric flows and pressure gradient profiles.

The bubbles that are stripped from the fiber 21 and that migrate upwardly into the reservoir 65 and coalesce into much larger bubbles may result in miscentering of the fiber in the coating. There is some tendency for the fiber 21 to be miscentered as it comes through the first die 35 but this is overcome by the second die 81 with the net result that the coating is substantially concentrically disposed about the fiber. The pressure in the 0.076 cm first die 35 and the incoming coating material cooperate and act as a dampening agent to stabilize the fiber 21. The elongated passageway 63 and other portions of the die cavity of the first die may be considered as a "core tube" through which the fiber 21 is advanced to the die 81. Because of locating forces caused by the coating material in the first die 35, the vibrations caused by the coalesced large bubbles in the reservoir 65 are not seen in the final die 81. The die 35 has been referred to as a lubricated "core tube" with respect to the second die 81. It is lubricated because unlike in the close fitting core tube of a conventional plastic extruder for copper wire, the coating material is flowing through it.

Also, the first die 35 is effective to precenter the fiber 21. Since the diameter of the orifice of the first die 35 is 0.076 cm and the fiber diameter is 0.013 cm, the fiber 21 can only experience a maximum excursion of 0.032 cm. In a single die applicator, the fiber 21 can experience wide excursions in its path through the applicator cup prior to the die.

It is also important that the passageway 63 of the upper chamber have a substantial length to prevent meniscus collapse. With such an arrangement, the meniscus could still collapse, but the relatively long 0.30 cm diameter portion prior to the 0.076 cm die impedes its collapse.

While in the preferred embodiment the dual die arrangement together with the converging dies avoids the abrupt hydrodynamic increases in prior art arrangements which have been geometry-controlled, there may be times when an abrupt increase is desired. This may still be accomplished with the apparatus of this invention by suitably controlling the pressure of the injected liquid coating material. The control is accomplished independently of the geometry of the apparatus.

Another advantage of this apparatus is that the reservoir 65 functions as a depository for the bubbles which are removed from the fiber. In some prior art apparatus, the coating is accomplished along an extended cylindrical or tapered land of an effectively single die. Without storage for the bubbles, there is an increased possibility of their flow along with the fiber. The continuous replenishment of the coating material in the reservoir 65 is effective to assure that the coated fiber is substantially bubble-free.

The overflow arrangement allows the use of the preferred back flow pressures without overflow of the housing 30. Without it, the back pressure must be reduced with a loss in the bubble stripping capability of the dual die arrangement.

Tests have shown how effective is the dual die arrangement of the invention. For a run which included seven lengths of fibers, it was found that about 30% of the fibers included about 46 bubbles per meter, about 28% involved about 0 bubbles per meter while about 42% was evenly divided among 3, about 12 and 30 bubbles per meter. With the apparatus 25 described hereinabove, it was found that 100% of fifty-seven fiber lengths included 0 bubbles per meter. As is evident, the number of bubbles is decreased dramatically and to the point where they have been substantially eliminated. It should be noted that in the bubble measurement process, only those bubbles 0.025 mm or larger are measured.

The coating process of the invention is suitable for primary coating of glass or plastic lightguide fiber, or for secondary coating of such fiber that is already coated. The process may be applied to either or both steps of a dual or multiple-coating in-line process or to any step of a sequential multiple-coating process where the fiber is spooled between coating steps. The process is also useful for the application of fluids to the fiber for surface modification prior to coating, for application of dyes or colorants for color coding, or for the application of fluid materials for other purposes. It is also useful for coating films comprised of materials other than glass such as polymer fibers, crystal fibers and metal fibers.

It is to be understood that the above-described arrangements are simply illustrative of the invention. Other arrangements may be devised by those skilled in the art which will embody the principles of the invention and fall within the spirit and scope thereof.

What is claimed is:

1. A method of coating an elongated material to provide a substantially bubble-free covering, said method including the steps of:
   advancing the elongated material through a continuum of liquid coating material, which extends from a free surface in a reservoir through first and second dies at opposite ends of a chamber, at a velocity which causes air to become entrained in the coating material, the advancing of the elongated material being in a direction from the reservoir to the second die and causing a pressure gradient to be established between portions of the first die and between the chamber and the second die with the pressure decreasing from an exit orifice of the first die to the free surface and increasing from within the chamber to a location prior to the exit orifice of the second die; and flowing coating material into the chamber at a pressure which sufficiently enhances the pressure gradient between the portions of the first die and which establishes sufficient volumetric flow of the coating material from the chamber into the reservoir to cause the removal of bubbles from the elongated material and to cause the coating material in the chamber and on the coated elongated material to be substantially bubble-free.

2. The method of claim 1, wherein the pressure of the coating material is in the range of about 40 newtons/cm$^2$.

3. The method of claim 1, which also includes the step of maintaining the free surface in the reservoir at a predetermined level.

4. The method of claim 1, wherein the coating material which is introduced into the chamber is effective to enhance the centering of the elongated material in the coating as the elongated material is advanced through the second die.

5. The method of claim 1, wherein the velocity of the advancing elongated material is at least 0.3 meter per second.

6. The method of claim 1, wherein the elongated material has a circular cross-section and the diameter of the exit orifice of the first die is about six times as great as the outer diameter of the uncoated elongated material.

7. The method of claim 1, wherein the reservoir is connected to the exit orifice of the first die through a passageway having a relatively long constant diameter section and a relatively short tapered section and through a land of the first die, and wherein the pressure in the coating material has a maximum value at the exit orifice thereof and a maximum value in the second die at a location adjacent to the exit orifice thereof.

8. The method of claim 7, wherein the length of the constant diameter section has a length which is about eight times the length of the land of the first die.

9. The method of claim 1, wherein the only path between the chamber and the reservoir for the coating material is through the first die.

10. An apparatus for coating an elongated material to provide a substantially bubble-free covering, said apparatus including:
container means for holding a coating material;
first die means communicating with said container means and including an exit orifice at one end thereof;
second die means for sizing coating material about the elongated material, said second die means communicating at one end thereof with said exit orifice at said first die means and having an exit orifice at an opposite end thereof which is aligned with said exit orifice of said first die means;
a chamber which is interposed between said first and second die means, the coating material being disposed in a continuum which extends from a free surface in said container means, through said first die means and said chamber, and into said second die means;
moving means for advancing the elongated material through said apparatus at a velocity which is sufficiently high to cause air to become entrained in the coating material, and to cause a pressure gradient to be established between portions of said first die means; and
means for flowing coating material into said chamber at a pressure which sufficiently enhances the pressure gradient between said portions of said first die means and which establishes sufficient volumetric flow from said chamber into said first die means to remove any bubbles adjacent to the elongated material and to cause the coated elongated material to be substantially bubble-free.

11. The apparatus of claim 10 wherein said exit orifice of said first die means has a diameter which is substantially greater than the outer dimension of the elongated material.

12. The apparatus of claim 10, wherein the pressure of the coating material which is flowed into said chamber is in the range of about 40 newtons/cm$^2$.

13. The apparatus of claim 10, wherein said exit orifice of said first die means is substantially larger in diameter than that of said exit orifice of said second die means.

14. The apparatus of claim 10, wherein said first die means includes a cylindrical passageway having an entrance which communicates with the coating material in said container means and an exit, a land which ends in said exit orifice of said first die means and a tapered portion which connects said exit of said passageway to said land.

15. The apparatus of claim 14, wherein the length of said cylindrical passageway is substantially greater than the length of said land of said first die means.

16. The apparatus of claim 14, wherein said tapered portion is such that a line of generation of its inner surface is at an angle of about 15° to an axis of said first and second die means.

17. The apparatus of claim 14, wherein said container means also includes an overflow port extending laterally therefrom above said entrance to said cylindrical passageway.

18. The apparatus of claim 14, wherein said pressure gradient which is enhanced is one which exists between said exit of said passageway and said exit orifice of said first die means.

19. The apparatus of claim 18, wherein the rate of change of the pressure is substantially constant between said exit orifice of said first die means and said exit of said passageway and is substantially greater than the rate of change of pressure between said exit and said entrance to said passageway.

20. The apparatus of claim 14, wherein the elongated material has a circular cross-section and the diameter of the passageway and the diameter of the first die means are each substantially greater than that of the elongated material.

21. The apparatus of claim 10, wherein the advance of the elongated material causes coating material to be drawn through said first die means and the flowing of the pressurized coating material into said chamber causes coating material from said chamber to be flowed upwardly through said first die means into said container means with the net volumetric flow being in an upward direction.

22. The apparatus of claim 10, wherein said first and said second die means each include a converging die.

23. The apparatus of claim 10, wherein said moving means causes the elongated material to be advanced at a velocity of at least 0.3 meter per second.

24. An apparatus for applying a liquid coating material to a drawn lightguide fiber which is being advanced to provide a substantially concentrically disposed bubble-free covering, said apparatus including:

first die means for holding the coating material, said means including a reservoir and a die, said die including a cylindrical passageway, which has a diameter substantially greater than that of the fiber and which has an entrance that communicates with said reservoir and an exit, said die also including an exit orifice, a land, and a tapered portion which connects said exit of said cylindrical passageway with said land;

second die means which includes a housing having a first portion, and a second portion depending from said first portion, said depending second portion having a chamber which communicates with a tapered lower portion and a die through which the fiber exits, said first die means being supported in said second die means with a portion of said die of said first die means extending through said first portion of said housing and into said chamber, the coating material extending in a continuum from a free surface of said reservoir through said die of said first die means, and into said second die means; and means for flowing pressurized coating material into said chamber at a pressure which sufficiently enhances a pressure gradient that is established between said exit orifice of said die of said first die means and said exit of said cylindrical passagway during the advance of the fiber through said apparatus and which establishes sufficient net volumetric flow upwardly to cause bubbles to be removed from the lightguide fiber and to cause the coating material in said chamber and on the coated fiber to be substantially bubble-free.

25. The apparatus of claim 24, wherein the diameter of said exit orifice of said first die means is about six times as great as that of said second die means.

26. The apparatus of claim 24, wherein the length of said cylindrical passageway has a length which is about eight times the length of said land of said first die means.

27. A method of coating an elongated material with a substantially bubble-free covering, said method including the steps of:

advancing the elongated material through a continuum of liquid coating material which extends from a reservoir through a die to a chamber to cause the elongated material to be enclosed in a covering, the advancing of the elongated material being at a velocity which causes air to become entrained in the coating material and in a direction from the reservoir to the chamber; and flowing coating material into the chamber at a pressure which sufficiently enhances the pressure gradient between portions of the die and which establishes sufficient volumetric flow of the coating material from the chamber into the reservoir to cause the removal of bubbles from the vicinity of the elongated material and the covering to be substantially bubble-free.

* * * * *